(12) United States Patent
Luthardt

(10) Patent No.: US 7,738,996 B2
(45) Date of Patent: Jun. 15, 2010

(54) METHOD FOR POSITIONING A WELDING ROBOT TOOL

(75) Inventor: Colin Luthardt, Västerås (SE)

(73) Assignee: ABB AB, Västerås (SE)

( * ) Notice: Subject to any disclaimer, the term of this patent is extended or adjusted under 35 U.S.C. 154(b) by 786 days.

(21) Appl. No.: 10/564,181

(22) PCT Filed: Jun. 30, 2004

(86) PCT No.: PCT/SE2004/001057

§ 371 (c)(1),
(2), (4) Date: Jan. 11, 2006

(87) PCT Pub. No.: WO2005/005089

PCT Pub. Date: Jan. 20, 2005

(65) Prior Publication Data

US 2006/0212169 A1    Sep. 21, 2006

(30) Foreign Application Priority Data

Jul. 11, 2003    (SE) .................................... 0302092

(51) Int. Cl.
*G06F 19/00* (2006.01)

(52) U.S. Cl. ............... 700/245; 700/90; 219/124.1; 219/125.12; 219/125.1; 219/124.4; 219/124.5; 318/568.1; 318/568.11; 318/568.16; 318/568.21; 318/568.22; 901/9; 901/10; 901/30; 901/41; 901/42

(58) Field of Classification Search ........... 700/245, 700/255; 219/124.1–124.5
See application file for complete search history.

(56) References Cited

U.S. PATENT DOCUMENTS

| 4,249,062 | A | * | 2/1981 | Hozumi et al. ......... 219/124.34 |
| 4,707,582 | A | * | 11/1987 | Beyer .................. 219/86.41 |
| 4,855,560 | A | * | 8/1989 | Sonoda et al. .......... 219/86.25 |
| 5,495,090 | A | * | 2/1996 | Mukai et al. .......... 219/124.34 |
| 5,528,011 | A | * | 6/1996 | Kono et al. ........... 219/86.41 |
| 5,779,609 | A | * | 7/1998 | Cullen et al. ............. 483/69 |
| 5,883,355 | A |   | 3/1999 | Kaneshima |
| 5,988,486 | A | * | 11/1999 | Kobayashi et al. ........ 228/212 |
| 6,008,612 | A | * | 12/1999 | Tanaka et al. ........... 318/652 |
| 6,037,733 | A | * | 3/2000 | Genov et al. .......... 318/568.11 |
| 6,044,308 | A | * | 3/2000 | Huissoon ................ 700/166 |
| 6,452,134 | B2 | * | 9/2002 | Hong ................ 219/124.34 |
| 6,516,248 | B2 | * | 2/2003 | McGee et al. ............ 700/254 |
| 6,540,128 | B2 | * | 4/2003 | Hirano et al. .......... 228/112.1 |

(Continued)

FOREIGN PATENT DOCUMENTS

EP    1005943 A2    6/2000

(Continued)

*Primary Examiner*—Khoi Tran
*Assistant Examiner*—Jonathan Sample
(74) *Attorney, Agent, or Firm*—Venable LLP; Eric J. Franklin

(57) ABSTRACT

A method for joining together at least two sheets with a tool controlled by an industrial robot and including a first arm and a second arm that are mutually movable in relation to each other. An actual position of the sheets is detected by bringing one of the arms to sense the actual position of the sheets. The distance between an ideal position and the actual position is calculated and the actual position of the tool is moved the calculated distance, whereafter the sheets are joined together.

11 Claims, 3 Drawing Sheets

U.S. PATENT DOCUMENTS

| | | | |
|---|---|---|---|
| 6,595,403 B2 * | 7/2003 | Okamura et al. | 228/112.1 |
| 6,715,665 B2 * | 4/2004 | Hirano et al. | 228/112.1 |
| 6,787,729 B2 * | 9/2004 | Dugas et al. | 219/86.32 |
| 6,941,826 B2 * | 9/2005 | Mitani et al. | 73/865.8 |
| 2003/0094441 A1 * | 5/2003 | Dugas et al. | 219/90 |
| 2004/0016723 A1 * | 1/2004 | Rohner | 219/86.8 |
| 2004/0144157 A1 | 7/2004 | Mitani et al. | |

FOREIGN PATENT DOCUMENTS

| | | |
|---|---|---|
| EP | 1245324 A1 | 10/2002 |
| JP | 2004154868 A | 6/2004 |
| WO | WO 9522428 A1 | 8/1995 |
| WO | WO-01/89755 A1 | 11/2001 |
| WO | WO 02098594 A1 | 12/2002 |

* cited by examiner

METHOD FOR POSITIONING A WELDING ROBOT TOOL

CROSS-REFERENCE TO RELATED APPLICATIONS

The present invention claims priority from Swedish patent application 0302092-2 filed 11 Jul. 2003 and is the U.S. National Phase under 35 U.S.C. §371 of PCT/SE2004/001057 filed 30 Jun. 2004.

TECHNICAL FIELD

The present invention relates to method for joining together at least two sheets by means of a tool controlled by an industrial robot and comprising a first arm and a second arm.

BACKGROUND ART

A robot system comprises an industrial robot comprising a manipulator and a control system. The manipulator comprises a robot arm with a wrist housing comprising a turn disc which is rotatably arranged relative to the wrist housing. The turn disc comprises a toolholder which is adapted for attachment of, for example, a tool for joining together at least two sheets by the influence of force and at one point. Examples of such methods of joining are spot welding, riveting and clinching. The control system comprises at least one program module and a plurality of processors which are adapted to attend to the movements of the manipulator based on instructions in a computer program. The turn disc may also be adapted for attachment of a fixture intended to hold at least two sheets to be joined together.

An industrial robot is composed of interconnected robot parts such as, for example, a stand, robot arms, an arm housing, a wrist housing, and a turn disc. Two adjoining robot parts are connected to each other so as to be rotatable in relation to each other about an axis of rotation, or are linearly displaceable in relation to each other.

During spot welding of at least two sheets with the aid of an industrial robot, it is known to use a so-called welding gun as a tool. The welding gun has a first movable electrode moving towards and away from a second fixed electrode. Common fields of use for a spot welding machine are cars, white goods, cupboards and cabinets.

There are mainly two types of welding guns: so-called X-guns and C-guns. A C-gun has the approximate shape of a C comprising two branches. A first welding electrode is movably arranged in a guide at one branch of the C and moves towards and away from an opposite second welding electrode at the opposite branch. An X-gun comprises a first movable electrode arm and an opposite fixed electrode arm. One example of an X-gun is shown in FIG. 2 and described under the heading "Description of the preferred embodiments".

A welding gun is usually controlled by compressed aid or by a servo motor. For a welding gun controlled by compressed air, the movement of the first electrode towards and away from the second electrode is achieved with a compressed-air cylinder. Patent publication WO 01/89755 describes a welding gun controlled by a servo motor and how a movable welding electrode is brought into the welding position under the influence of the servo motor.

When joining together at least two sheets by the influence of force and at a definite point, a tool such as, for example, a welding gun, comprising a first movable electrode arm and a second fixed electrode arm, is used. The electrode arms are arranged on opposite sides of the at least two sheets that are to be joined together. For the joining to provide a joint that is centred in the thickness direction of the sheets, the free end of the second fixed arm, which comprises the electrode, is to lie in the same plane as the sheets. Usually, the position of the second fixed arm deviates from the plane of the sheets, which results in the welding causing a deformation of the sheets. This may lead to deteriorated surface quality on the finished product. The reasons for the electrode arms not being centred are, for example, that the sheet is not accurately positioned in the fixture that holds the sheet in place, or that the tip of the welding electrodes has been worn down during the course of the welding.

The corresponding problems arise also for other types of joining methods, such as, for example, during riveting and clinching, where the tool comprises at least two arms which are to join said sheets together, at least partly by the influence of force.

It is known to solve the above-mentioned problems by using a balancing system, also referred to as an equalizing system, which ensures that the second fixed arm is brought to a level that lies in the same plane as the sheets. During the balancing, a balancing system, also known as equalizer, is arranged between the tool and the turning plate of the robot. The equalizing system is, in principle, a disengagable clutch, which during the movement of the tool is in a fixed position and with the second fixed arm at a defined distance from the sheet. At the end phase of the closing movement of the arms and during the joining process, the clutch is disengaged such that the tool is able to move relative to the turning plate.

It is known to use equalizing systems that are controlled by compressed air or are electrically controlled. During compressed-air equalizing, compressed air must be supplied to the tool. A considerable volume of air is required, which results in increased operating costs. As far as electrically controlled equalizing is concerned, cabling must instead be pulled to the tool. Both types of systems give an increased installation cost and increased maintenance costs compared with the case where no equalizing system is needed. An additional disadvantage of the above-mentioned equalizing systems is that they behave differently depending on how the tool is oriented in space. This is due to the described equalizing systems being dependent on the force of gravity.

There is therefore a need to be able to equalize the arms in a tool for joining together at least two sheets in a joint without having to use compressed-air-controlled or electrically controlled equalizing systems. Further, there is a need of a process for joining that is simple and where the result of the joining process is a joint which is centred in the sheets and which hence imparts a good surface quality to the finished product.

SUMMARY OF THE INVENTION

The object of the invention is to provide a method for joining at least two sheets which is simpler, which results in improved precision, which involves a lower investment cost, which entails lower operating costs than the prior art, and which results in a joint with a good surface quality.

According to the invention, this object is achieved by a method. The object of the invention is also achieved by a computer program, and in a use. Advantageous embodiments will become clear from the following description.

According to the invention, at least one of the two arms of the tool is brought to detect the position of the sheets and the robot compensates for the position of the tool if the actual position (d) of the sheets deviates from an ideal position (c). This gives a well-centred joining with a high quality.

The ideal position (c) for joining is determined during a calibration procedure prior to joining. The two arms of the tool meet to determine an exact relative position on that surface on the free end of the second arm which makes contact with the sheet during the joining process. The calibration procedure is carried out either prior to each joining operation or, for example, upon start-up of the robot, or when all of, or parts of, the tool has/have been replaced. The ideal position (c) is stored, for example, in the control system of the robot.

In a method for joining at least two sheets in a joint by means of a tool controlled by an industrial robot, wherein the tool comprises a first arm and a second arm, the actual position (d) of the sheets is detected by at least one of the arms moving towards the sheets and sensing the position of the sheets. The ideal position (c) for joining the sheets is stored in the robot. The difference between the actual position (d) and the ideal position (c) is calculated. The industrial robot controls the tool and moves, where necessary, the position of the tool the calculated distance in a direction towards the sheet. The sheets are joined together by a centred joint.

According to an advantageous embodiment, the tool is controlled by an electric servo motor, the servo motor operating the two arms of the tool and achieving a relative movement between the arms. The first arm is brought to move towards the sheets and to detect the actual position (d) of the sheets by the servo motor sensing when the first arm reaches the sheets. This occurs at a predefined torque in the motor.

According to a further development of the invention, the industrial robot is designed to sense the actual position (d) of the sheets by connecting the tool and the sheet to an electric circuit. The first arm is brought to move towards the sheets and when the electric circuit is closed, the actual position (d) of the sheets is closed. The actual position (d) is stored in the control system.

According to a further advantageous development of the invention, the second arm is brought to move towards the sheets and when the electric circuit is closed, the actual position (d) of the sheets is detected.

According to an additional further development, the tool is controlled by a pneumatic device which achieves a relative motion between the arms. The tool and the sheets are connected to an electric circuit. The second arm is rigidly connected to the mounting plate. The second arm is brought to move towards the sheets by the position of the tool being changed with the aid of the robot and when the electric circuit is closed, the actual position (d) of the sheets is detected.

According to a preferred embodiment of the invention, a computer program comprises instructions to influence a processor to carry out the method as described above. A computer-readable medium comprises the above-mentioned computer program.

The method described above is used, for example, in any of the following methods of joining: spot welding, riveting, or clinching.

Since the first or the second arm detects the position of the workpiece during its movement towards the workpiece and allows the robot to compensate in case of an off-centre tool, a joint is obtained which is well-centred with respect to the thickness of the sheets at the point of joining, and which maintains a high quality.

Another advantage of the invention is that, since the robot itself compensates for the fact that the tool is off centre, lower investments are required and the operating cost is reduced compared with the case where, for example, compressed air were to be used for the balancing.

Still another advantage is that the invention gives a satisfactory balancing which is not changed with a changed orientation of the tool in space.

BRIEF DESCRIPTION OF THE DRAWINGS

The invention will be explained in greater detail, by description of embodiments, with reference to the accompanying drawings, wherein.

DESCRIPTION OF THE PREFERRED EMBODIMENTS

The following description relates both to the method and to the device.

Figure 1:
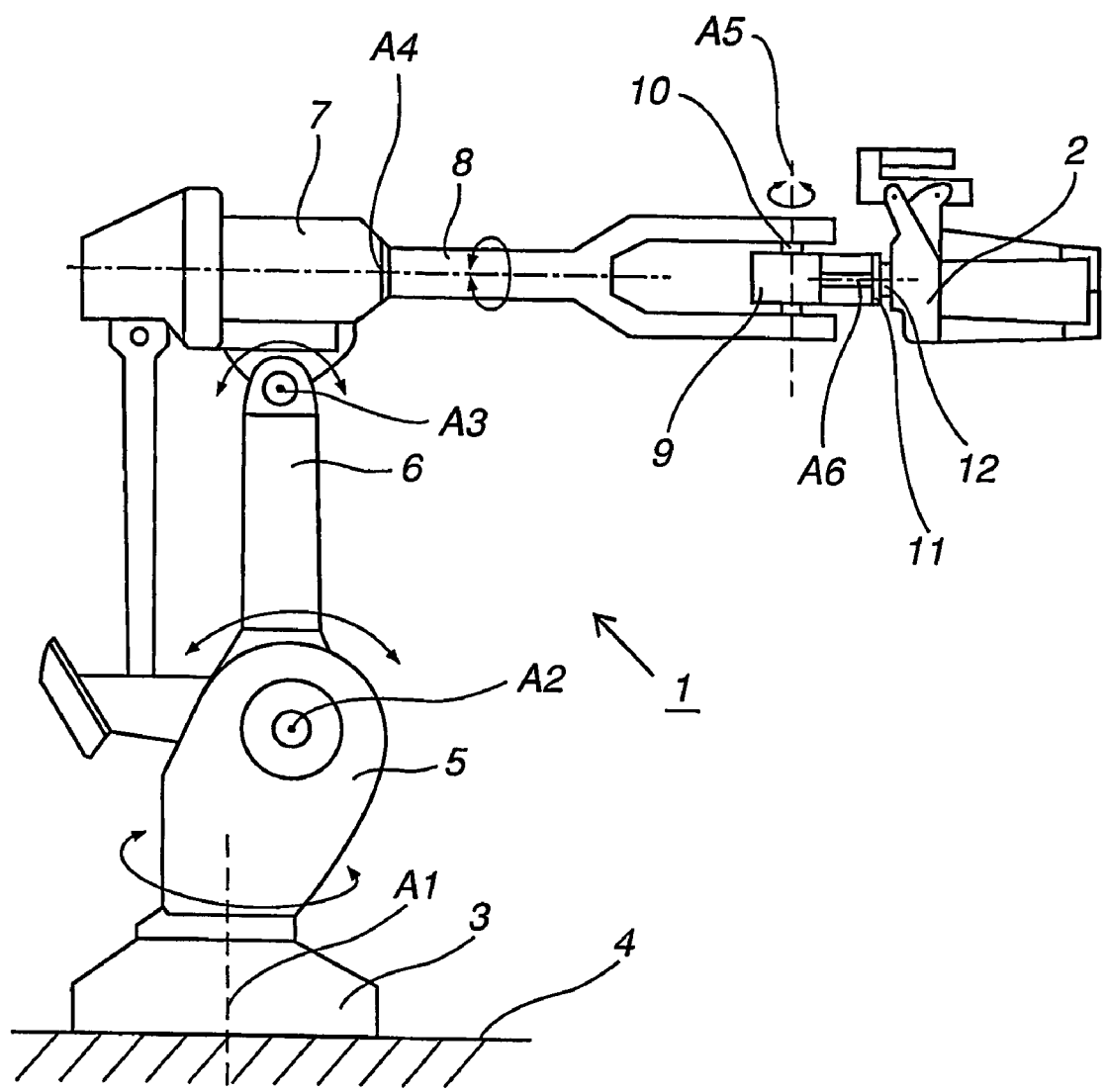
FIG. 1 shows a side view of an industrial robot with a tool for spot welding.

FIG. 1 shows an example of a prior art industrial robot 1 comprising a tool, a so-called welding gun 2. The industrial robot comprises a foot 3 that is mounted to a base 4. The foot 3 supports a stand 5, which is rotatably arranged in relation to the foot 3 about a first axis A1. The stand 5 supports a first robot arm 6, which is rotatable in relation to the stand 5 about a second axis A2. The first robot arm supports an arm housing 7, which is rotatable in relation to the first robot arm 5 about a third axis A3. The arm housing 7 supports a second robot arm 8, which is rotatable in relation to the arm housing 7 about a fourth axis A4, and where the fourth axis A4 coincides with the longitudinal axis of the second robot arm 8. The second robot arm 8 comprises a wrist housing 9, which is supported by a wrist 10. The wrist housing 9 is rotatable about a fifth axis A5 which coincides with the longitudinal axis of the wrist. The wrist housing 9 supports a turn disc 11, which is rotatably arranged about a sixth axis A6. The turn disc 11 comprises a toolholder 12, which is adapted for attachment of a tool, such as, for example, a welding gun 2.

Figure 2:
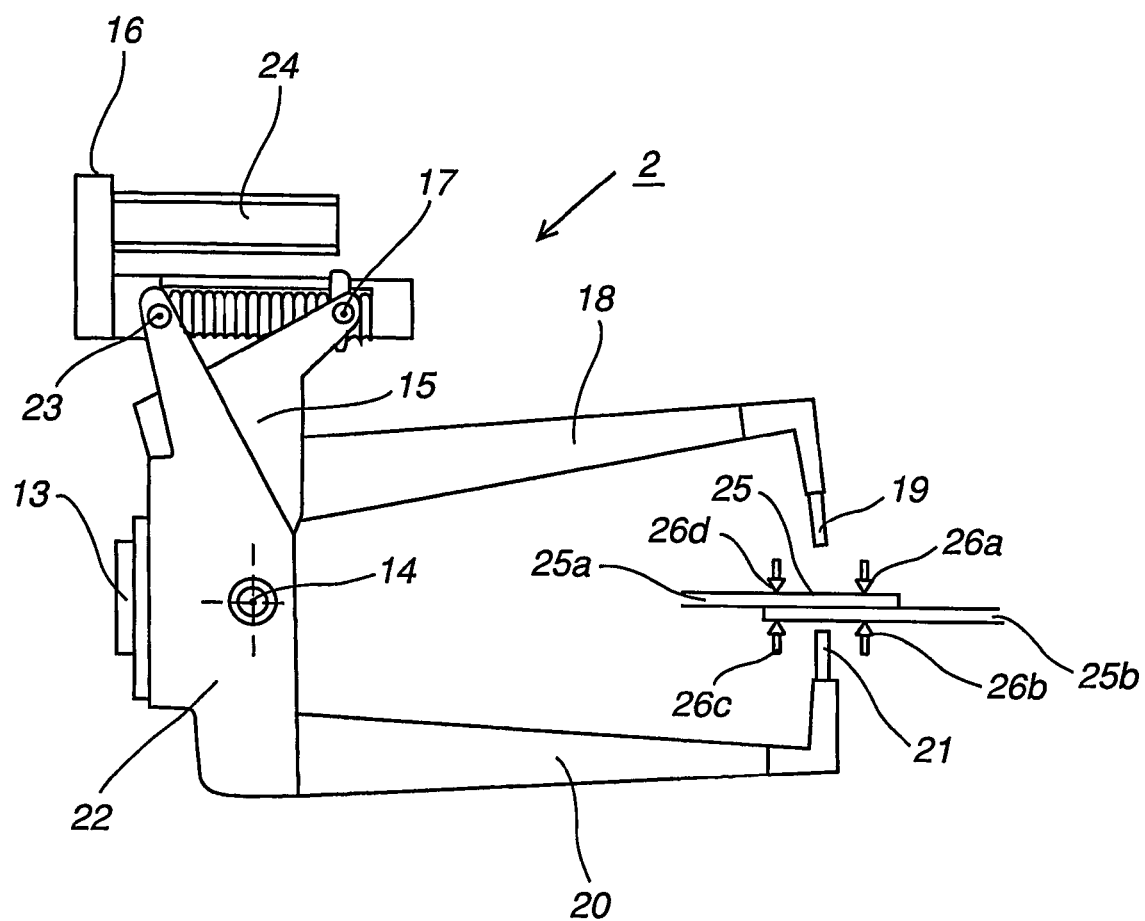
FIG. 2 shows a schematic side view of a welding gun with a servo motor in the open position.

The industrial robot comprises a control system and a manipulator comprising the robot arm 8 and the welding gun 2. FIG. 2 shows the welding gun 2, which comprises a mounting plate 13 for attaching the welding gun 2 to the toolholder 12 on the industrial robot 1. Rigidly connected to the mounting plate 13, the welding gun 2 has a flexible axle 14, around which a first yoke 15 is pivotally arranged.

The first yoke 15 is connected to a servo device 16 via a first joint 17 as well as to a first movable electrode arm 18, which at its outer, free end supports a first welding electrode 19.

The welding gun also comprises a second electrode arm 20, which at its outer, free end supports a second welding electrode 21. The second electrode arm 20 is rigidly connected to the mounting plate 13 via a second yoke 22, such that the second electrode arm 20 is immovably connected thereto. The mounting plate 13, the second yoke 23 and the second electrode arm 20 constitute a rigid unit. The servo device 16 is connected via a second joint 23 to the second yoke 22.

The servo device 16 comprises an electrically driven servo motor 24, which controls the first movable electrode arm 18 and the first electrode 19 supported thereby to carry out movements towards and away from the second electrode 21.

The movement and the position of the first electrode 19 and the second electrode 21 are controlled, for example, by the software which controls the industrial robot and which, via the servo device 22, determines the distance between the two welding electrodes. The movement and the position of the electrodes may also be controlled by a separate control system.

During spot welding of at least two sheets 25a, 25b, it is important that the second electrode lies in the same plane as the sheets 25a, 25b so that the electrodes meet the sheets 25a, 25b at a predetermined position between the electrodes and with a predetermined welding force. The predetermined position is characterized in that the sheets 25a, 25b are not influenced more in any direction so that the weld is off centre in the direction of thickness of the sheets.

Before the spot welding begins, a calibration procedure of the second fixed electrode is carried out to determine the ideal position (c) for the joining. The calibration procedure is carried out either before each joining operation or, for example, during start-up of the robot, or when all of, or parts of, the tool has/have been replaced. The thickness t of the sheets, included in the workpiece 25, which are to be welded together is known. The ideal position (c) is stored, for example, in the control system of the robot, or in a separate control system for the welding gun.

When the spot welding is to start, the robot places itself in a predefined and programmable welding position with the electrode arms 18, 20 on opposite sides of the sheets 25a, 25b. The sheets 25a, 25b which are to be welded together are usually fixedly mounted in a fixture 26a, 26b, 26d, 26c. The two sheets 25a, 25b are placed against the second electrode 21.

The first welding electrode 19 is brought to move, while being controlled by the electric motor 24, towards the second welding electrode 21 until it hits the sheets 25a, 25b at a previously defined torque M in the motor. An actual position (d) of the workpiece 25 is detected.

The difference between position (d) and position (c) is calculated and the magnitude of the difference determines whether a balancing of the position of the welding gun 2 has to be performed. The need of balancing is determined by given tolerances as to how much the actual position (d) of the sheets 25a, 25b between the electrodes 19, 21 is allowed to deviate from the ideal position (c).

If balancing needs to be performed, the robot compensates for the off-centre position of the sheets 25a, 25b by moving the second electrode arm 20, which is rigidly connected to the mounting plate, the distance corresponding to the difference between the ideal position (c) and the actual position (d) in a direction towards the sheets. When the balancing has been carried out, the first electrode 19 is moved to the sheets 25a, 25b and applies to the sheet a predetermined welding force and thereafter carries out the welding operation.

The calibration for finding the ideal position (c) takes place either before each welding operation or on, for example, the following occasions: during start-up of the program of the robot, or when the tool has been replaced, or after sharpening of the electrodes.

Since the first welding electrode is driven by an electric motor, the first welding electrode is controlled in an accurate manner by the software that also controls the actual industrial robot.

Figure 3:
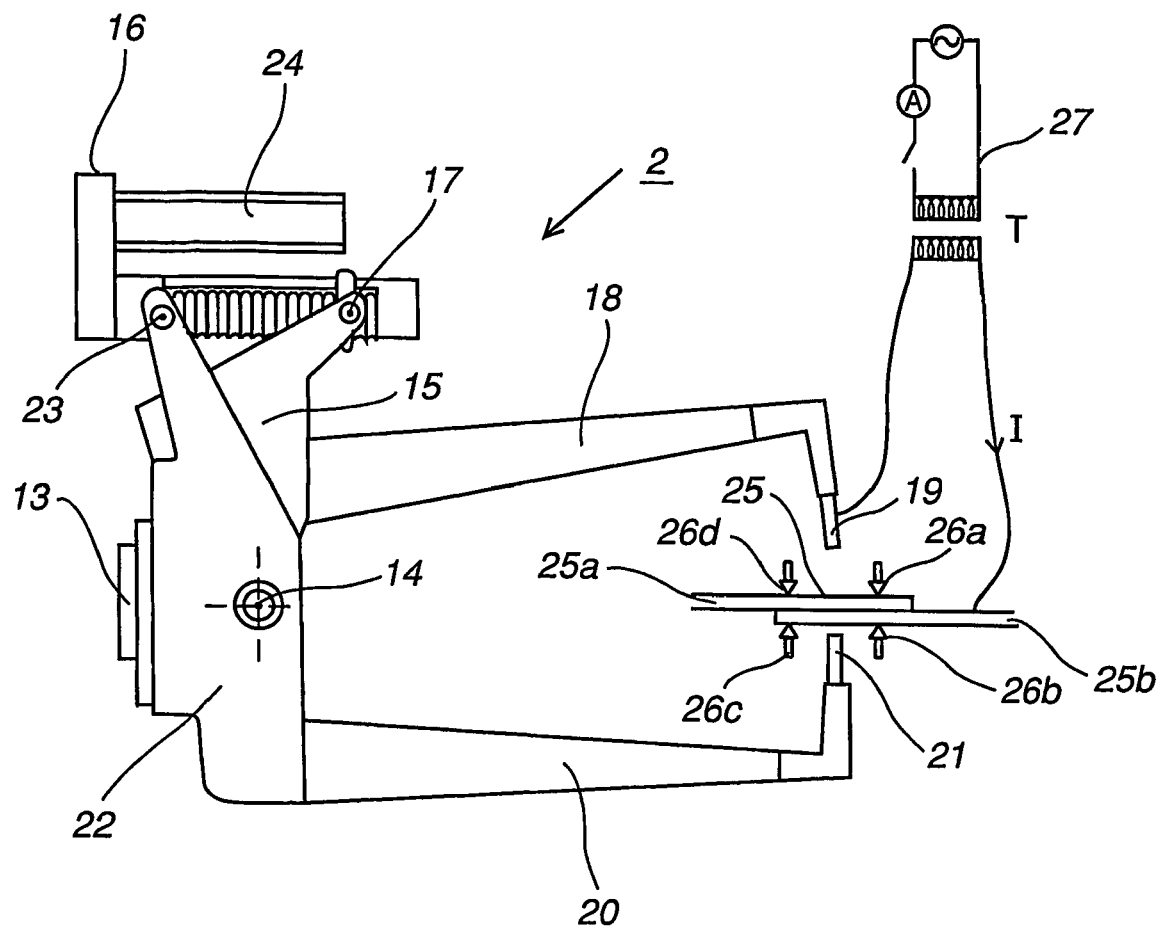
FIG. 3 shows a schematic side view of a welding gun according to one embodiment of the invention.

FIG. 3 shows a further development of the invention where the detection of the actual position (d) of the sheets 25a, 25b between the electrode arms 18, 20 occurs in that an electric circuit 27, through which a current I flows, is connected to the tool and the sheets 25a, 25b. The first electrode arm 18 is brought to move towards the sheets 25a, 25b, and when the electric circuit is closed, the actual position (d) of the sheets is detected. The actual position (d) is registered in the control system. The electric circuit 27 starts, for example, from the welding time regulator which is designed to detect a current I from the regulator via the transformer T to the welding electrode 19, 21 which is in electric contact with the sheets 25a, 25b.

If balancing needs to be performed, the robot compensates for the off-centre position of the sheets 25a, 25b by moving the second electrode arm 20, which is rigidly connected to the mounting plate, the distance corresponding to the difference between the ideal position (c) and the actual position (d). When the balancing has been carried out, the first electrode 19 is moved to the sheets 25a, 25b and applies to the sheet a predetermined force and thereafter carries out the welding operation.

According to another advantageous further development of the invention, the detection of the actual position (d) of the sheets 25a, 25b occurs in that an electric circuit 27, through which a current I flows, is connected to at least the second electrode arm 20 and the sheets 25a, 25b.

The second electrode arm 20, that is, the whole tool, is brought to move towards the sheets 25a, 25b and when the electric circuit is closed, the actual position (d) of the sheets is detected. The difference between the actual position (d) of the sheets 25a, 25b and the ideal position (c) is calculated and is stored, for example, in the control system of the robot. The first electrode 19 is moved to the workpiece 25 and applies to the sheets 25a, 25b a predetermined force and thereafter carries out the welding operation.

The calculated difference between the ideal position (c) and the actual position (d) is stored in, for example, the control system of the robot. The calculated difference optimizes the movement of the tool in that, during each balancing, the robot remains in the position that was calculated during the immediately preceding balancing.

The industrial robot 1 comprises a manipulator and a control system (not shown), which comprises a program module and at least one processor which are arranged to attend to the movements of the manipulator based on instructions in a computer program. The processor comprises a central processing unit (CPU), which carries out the steps of the method according to the invention. This is carried out with the aid of one or more computer programs, which are stored at least partly in a memory that is reached by one or more processors.

According to one embodiment of the invention, the industrial robot comprises a computer program comprising instructions to influence a processor to carry out the method according to the invention. The computer program is stored on a computer-readable medium that is read into the control unit and carries out the method.

The invention is not limited to the embodiments shown, but a person skilled in the art may, of course, modify it in a number of ways within the scope of the invention as defined by the claims. Thus, the invention is not limited to an X-gun but may also be applied to a C-gun. The invention is not limited to servo motor-controlled tools but may also be applied to compressed-air-controlled tools.

Further, the invention is not limited to spot welding but may also be applied to other methods for joining together at least two sheets by the influence of force and at a point between two tool arms such as, for example, during riveting or clinching.

Nor is the invention limited to the robot supporting the tool and the at least two sheets 25a, 25b being arranged in a fixed fixture, as described in the embodiments above. The invention also comprises arranging the tool in a fixed fixture, separate from the robot, and arranging the robot to hold the sheets 25a, 25b to be joined together.

The invention is:

1. A method for positioning a tool comprising a mounting plate, a first arm and a second arm, the second arm being rigidly connected to the mounting plate, the first arm and the second arm being movable to a position for joining together at least two sheets, wherein the tool is part of a robot system comprising an industrial robot and wherein an ideal position of the sheets for joining between the arms is stored in a control system of the robot, the method comprising:
- arranging the sheets between the arms of the tool,
- detecting an actual position of the sheets by moving one of the first arm and the second arm of the tool in a direction towards the sheets and into contact with the sheets to sense the actual position of the sheets,
- calculating a distance between the ideal position of the sheets between the arms for joining and the actual position of the sheets,
- controlling the tool with the industrial robot and, where necessary, moving an actual position of the second arm with the robot the calculated distance in a direction towards the sheets, and
- joining the sheets together with the tool utilizing a centered joint.

2. The method according to claim 1, wherein the industrial robot supports the tool.

3. The method according to claim 1, wherein the ideal position for joining is detected by bringing both arms of the tool to meet where a free end of one of the arms will make contact with the sheet during the joining, and wherein the ideal position for joining is stored in the control system of the robot.

4. The method according to claim 1, wherein the second arm is secured to the industrial robot.

5. The method according to claim 1, wherein the tool is controlled by an electric servo motor, and wherein the first arm is operated by the servo motor.

6. The method according to claim 5, wherein the servo motor is brought to sense when the first arm reaches the sheets.

7. The method according to claim 1, wherein an electric circuit is connected to the tool and to at least one of the sheets, wherein one of the arms is brought to move towards the sheets, and wherein the actual position of the sheets between the electrode arms is detected when a current flows through the circuit.

8. The method according to claim 1, wherein the tool is controlled by a pneumatic device which achieves a relative movement between the arms, and wherein an electric circuit is connected to the tool and the sheets, wherein the second arm is brought to move towards the sheets, and the actual position of the sheets between the electrode arms is detected when a current flows through the circuit.

9. A computer program product, comprising:
- a computer readable medium; and
- computer program instructions recorded on the computer readable medium and executable to influence a processor to carry out a method comprising arranging the sheets between the arms of the tool, detecting an actual position of the sheets by moving one of the first arm and the second arm of the tool in a direction towards the sheets and into contact with the sheets to sense the actual position of the sheets, calculating a distance between the ideal position of the sheets between the arms for joining and the actual position of the sheets, controlling the tool with an industrial robot and, where necessary, moving an actual position of the second arm with industrial robot the calculated distance in a direction towards the sheets, and joining the sheets together with the tool utilizing a centered joint.

10. The method according to claim 1, wherein the centered joint is formed utilizing any of: spot welding, riveting, or clinching.

11. The method according to claim 1, wherein the first arm senses the actual position of the sheets by bringing the first arm to move towards the sheets.

* * * * *